Sept. 9, 1958
W. MÜLLER ET AL
2,851,478
PROCESS FOR THE PRODUCTION OF ACRYLONITRILE
Filed June 20, 1956
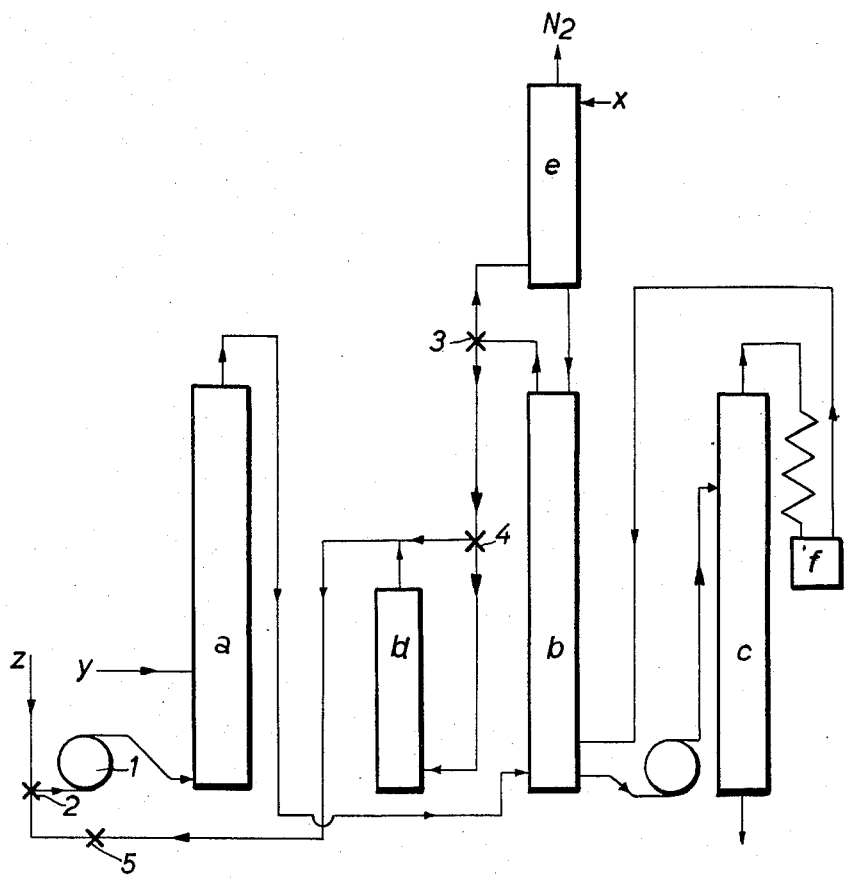
INVENTORS:
WILHELM MÜLLER, JOSEF HEINEN, JOHANNES CASPER.
BY Burgess, Dinklage & Sprung
ATTORNEY

United States Patent Office 2,851,478
Patented Sept. 9, 1958

2,851,478

PROCESS FOR THE PRODUCTION OF ACRYLONITRILE

Wilhelm Müller, Leverkusen, Josef Heinen, Leverkusen-Bayerwerk, and Johannes Casper, Leverkusen, Germany, assignors to Farbenfabriken Bayer Aktiengesellschaft, Leverkusen, Germany, a corporation of Germany Application June 20, 1956, Serial No. 592,556

Claims priority, application Germany July 1, 1955

2 Claims. (Cl. 260—465.3)

This invention relates to a process for the production of acrylonitrile.

In the production of acrylonitrile from acetylene and hydrocyanic acid in the presence of acid cuprous chloride solutions and at elevated temperature, the acetylene is generally pumped in circulation at such a velocity through the contact solution that some of the acetylene reacts with a corresponding amount of added hydrocyanic acid to form acrylonitrile.

At the high reaction temperature, the reaction products are driven out of the contact solution by the excess acetylene and, where they are soluble, they are washed out of the reaction gases with the aid of wash water. For example acrylonitrile, excess hydrocyanic acid and the acetaldehyde which is formed can be washed out of the reaction gases, and these compounds can be obtained from the wash water in known manner. The residual gas is then supplied afresh to the contact solution after replacement of the acetylene which has been consumed.

The disadvantage of this process is that secondary products are also formed which are not or not sufficiently removed from the circulating gas by the water; in time these secondary products become increasingly concentrated in the circulating gas and have a deleterious effect on the reaction between acetylene and hydrocyanic acid to form acrylonitrile.

Various proposals have already been made for preventing this falling-off in output and maintaining the necessary acetylene concentration in the circulating gas.

For example, it has been proposed in German Patent No. 851,340 to extract the organic secondary products of the reaction from the circulating gas by means of absorption agents, such as active carbon, while U. S. patent specification 2,579,638 proposed the use of organic solvents for the same purpose. Other proposals have also been made, such as for example low cooling of the circulating gas to —70° C.

In contrast thereto, it has been shown in German patent specification 884,643 that it is disadvantageous, for example, for the vinyl acetylene to be removed from the circulating gas, since this lowers the yield of acrylonitrile.

Furthermore, experience has shown that the processes proposed are not sufficient in most cases to prevent the lowering of the yield of acrylonitrile, owing to lowering of the acetylene concentration of the circulating gas. Therefore, a method has been devised to continuously remove part of the circulating gas and to replace that part by fresh pure acetylene.

It has now been found that when acrylonitrile is synthesized by the known methods from acetylene and hydrocyanic acid, carbon dioxide and nitrogen are formed as secondary products. These compounds become increasingly concentrated in the circulating gas, since they are not removed in the previously usual working up of the reaction gases. Owing to the concentration of these inert gases, the conversion of acetylene and hydrocyanic acid into acrylonitrile is still further reduced. If these two gases are now removed from the circulating gas, the conversion is restored to its original value. Accordingly the present invention provides a process for the continuous production of acrylonitrile from acetylene and hydrocyanic acid in the presence of acid cuprous chloride solutions at elevated temperature, wherein the gases carbon dioxide and nitrogen forming as secondary products are largely removed from the circulating gas.

The novel process can for example be carried out by subjecting the reaction gases leaving the reaction tower to the usual washing process, and freeing the circulating gas leaving the washing column from carbon dioxide by washing it with aqueous alkali. The nitrogen can for example be removed by washing the circulating gas with water in a washing tower, whereupon the acetylene dissolves in the washing water, whereas the nitrogen, which is only sparingly soluble in water, remains as residual gas and can be removed. The wash water saturated with acetylene is advantageously used for washing the gases leaving the reaction tower. It is preferred not to subject the whole of the circulating gas to this treatment, but merely some of the said gas (for example 3%), depending on the amount of nitrogen and carbon dioxide which is in the circulating gas.

The circulating gas thus purified is returned to the reaction tower again after the acetylene consumed has been replaced, and is reacted with a corresponding amount of added hydrocyanic acid to form acrylonitrile.

The process of the invention makes it possible for acrylonitrile to be produced continuously with the process operating at uniform capacity.

The invention will now be further illustrated by reference to the single figure of the accompanying drawing.

In a process for the continuous production of acrylonitrile from acetylene and hydrocyanic acid in the presence of acid cuprous chloride solutions at elevated temperature, wherein the gases carbon dioxide and nitrogen forming as secondary products are largely removed from the circulating gas, the circulating gas is pumped by means of a pump 1 into a reaction tower $a$ containing catalyst. Fresh acetylene is fed in at Z through a control valve 2 to replace the acetylene used up in the reaction tower, and a corresponding amount of hydrocyanic acid is supplied by pumping to the tower at Y, 1.00 to 1.30 mols of hydrocyanic acid being supplied for each mol of acetylene consumed.

The reaction gases leave the top of reaction tower and are introduced into a washing column $b$, in which they are freed from acrylonitrile, hydrocyanic acid, acetaldehyde, etc. The circulating gas leaving the washing column is passed through a branch pipe 3, and can then, depending on requirements, be freed partially from nitrogen by means of a nitrogen extractor (washing column $e$ into which wash water is introduced at X), and be freed from carbon dioxide by passing it through a branch pipe 4 into an alkali liquor washing system $d$, before it is pumped back into the reaction tower again by the pump 1 and after taking up the fresh acetylene at 2.

The acrylonitrile is driven out of the wash water together with the excess hydrocyanic acid, dissolved acetylene, carbon dioxide, etc. in a separating column $c$, and collects as moist crude nitrile in a receiver $f$. The de-aeration of this crude nitrile receiver returns the uncondensed gases back to the washing column, so that as a whole there is provided a closed system, from which it is merely the nitrogen which is continuously removed by way of the nitrogen washing column $e$.

The composition of the circulating gas is constantly controlled at a measuring station 5 and the nitrogen washing system or alkali liquor washing system is switched in on the basis of these control analyses.

If in this continuous installation the $CO_2$ and $N_2$ washing systems are switched off the circulating gas changes its composition as follows:

*Composition of circulating gas*

| Period (days) | Carbon dioxide | Nitrogen | Acetylene | Vinyl chloride | Monovinyl acetylene | Chloroprene | Other constituents | Acrylonitrile yield in 24 hours, kg. |
|---|---|---|---|---|---|---|---|---|
| 0 | 13 | 9 | 67 | 6 | 3 | 2 | 1 | 6,000 |
| 1 | 17 | 13 | 58 | 8 | 1 | 3 | 1 | 5,200 |
| 2 | 18 | 18 | 52 | 7 | 2 | 3 | 1 | 4,700 |
| 3 | 21 | 24 | 44 | 6 | 3 | 2 | 1 | 4,000 |
| 4 | 23 | 25 | 40 | 7 | 3 | 2 | 1 | 3,500 |
| 6 | 26 | 28 | 33 | 8 | 2 | 3 | 1 | 3,000 |

After circulation for 6 days, the nitrogen extractor is opened to allow approximately 3% of the circulating gas to enter the nitrogen washing system.

| | | | | | | | | |
|---|---|---|---|---|---|---|---|---|
| 6 | 26 | 28 | 33 | 8 | 2 | 3 | 1 | 3,000 |
| 8 | 28 | 18 | 41 | 6 | 4 | 1 | 2 | 3,700 |
| 10 | 34 | 10 | 43 | 9 | 2 | 4 | 1 | 4,000 |
| 12 | 36 | 6 | 44 | 10 | 1 | 2 | 1 | 4,000 |
| 15 | 39 | 6 | 42 | 7 | 3 | 3 | 1 | 3,700 |

In addition to the switching in of the nitrogen extractor, about 10% of the circulating gas is then branched off through the alkali liquor washing system.

| | | | | | | | | |
|---|---|---|---|---|---|---|---|---|
| 18 | 30 | 5 | 52 | 8 | 2 | 3 | 1 | 4,600 |
| 20 | 21 | 7 | 60 | 6 | 3 | 2 | 1 | 5,300 |
| 22 | 13 | 6 | 71 | 7 | 1 | 1 | 1 | 6,200 |
| 24 | 14 | 5 | 69 | 7 | 3 | 2 | 1 | 6,000 |

We claim:

1. A process for the continuous production of acrylonitrile from acetylene and hydrocyanic acid in the presence of acid cuprous chloride solutions at elevated temperature, which comprises removing from the circulating gas the carbon dioxide gas with aqueous alkali and the nitrogen gas by washing the circulating gas with such an amount of water that the acetylene is dissolved in the water while the undissolved remaining nitrogen gas is removed.

2. The process as claimed in claim 1, wherein only part of the circulating gas is treated in the described manner.

References Cited in the file of this patent

UNITED STATES PATENTS

| 2,385,470 | Salley et al. | Sept. 25, 1945 |
| 2,683,734 | Porret | July 13, 1954 |
| 2,733,259 | De Croes et al. | Jan. 31, 1956 |
| 2,744,926 | Koons | May 8, 1956 |